April 15, 1941. N. F. HADLEY ET AL 2,238,728
LIGHT FOR MOTOR VEHICLES
Filed March 31, 1938
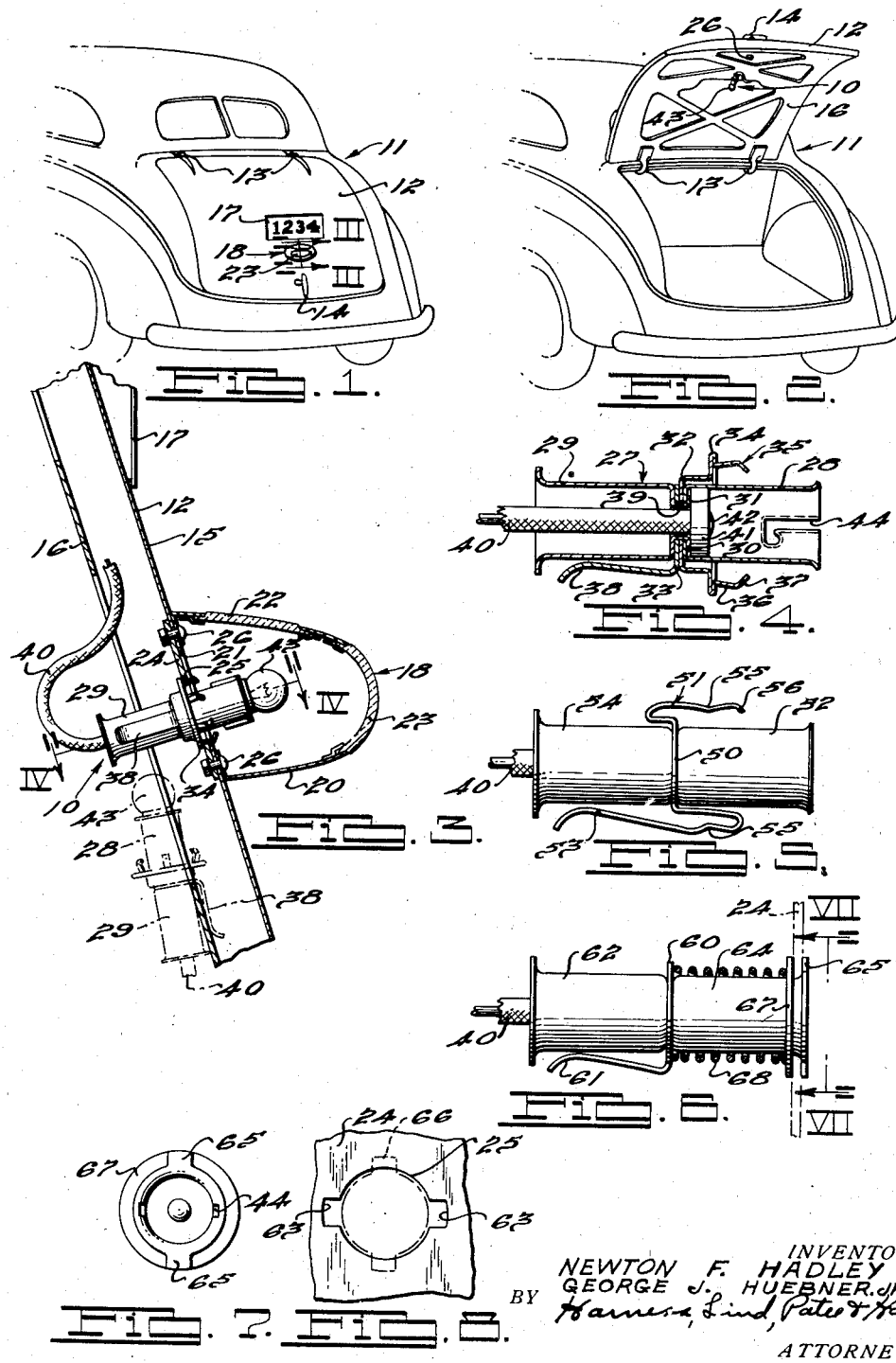
INVENTOR
NEWTON F. HADLEY AND
GEORGE J. HUEBNER, JR.
BY
ATTORNEYS Patented Apr. 15, 1941

2,238,728

UNITED STATES PATENT OFFICE 2,238,728

LIGHT FOR MOTOR VEHICLES

Newton F. Hadley, Birmingham, and George J. Huebner, Jr., Detroit, Mich., assignors to Chrysler Corporation, Highland Park, Mich., a corporation of Delaware Application March 31, 1938, Serial No. 199,064

1 Claim. (Cl. 240—8.3)

This invention relates to motor vehicles and more particularly to a novel means for illuminating the luggage compartment thereof.

One object of the invention is to provide an electric light bulb which normally serves to illuminate a tail light for motor vehicle trunk bodies or business coupe bodies having a deck lid which opens into a luggage compartment, which light bulb can be quickly and conveniently converted into a trunk or luggage compartment light for illuminating the interior thereof.

Other objects and advantages of the invention will be more apparent from the following description taken in connection with the accompanying drawing, in which Fig. 1 is a perspective view of a portion of a trunk sedan type of motor vehicle embodying the invention.

Fig. 2 is a perspective view, corresponding to Fig. 1, but illustrating the lid of the trunk in its raised condition.

Fig. 3 is a vertical cross-sectional view of a portion of an automobile provided with a tail lamp constructed in accordance with our invention, the section being taken along the line III—III of Fig. 1.

Fig. 4 is an enlarged cross-sectional view of a portion of the structure shown in Fig. 3, the section being taken along the line IV—IV of Fig. 3.

Fig. 5 is a side elevational view of a lamp bulb socket illustrating another embodiment of our invention.

Fig. 6 is a side elevational view, partly in section, somewhat similar to Fig. 5 but illustrating a still further embodiment of the invention.

Fig. 7 is an end elevational view taken, as indicated, along the line VII—VII of Fig. 6.

Fig. 8 is a detail elevational view of the vehicle body mounting plate for receiving and supporting the light illustrated in Fig. 6.

In the form of the invention illustrated in Figs. 1 to 4, inclusive, of the drawing, the improved light which is generally indicated by the numeral 10 is illustrated as embodied in a motor vehicle trunk sedan body 11, although the improved light may be used in any motor vehicle body in which access may be had to the rear surface of the light supporting panel or bracket. A trunk lid 12 is hinged to the body 11 at 13 and is provided with a latch handle 14. The trunk lid 12 comprises an outer panel 15 and an inner panel 16, the latter having portions thereof cut away to effect a saving in weight. To the outer surface of the trunk lid are secured, in juxtaposition, a license plate 17 and a tail light 18 which also serves to illuminate the license plate 17.

The tail light 18 comprises a metallic casing 20 mounted so as to close an opening 21 in the outer lid panel 15 and is provided with a translucent window 22 adjacent the license plate 17, and a red lens 23 directed away from the rear end of the motor vehicle. A metallic reinforcing plate 24, provided with an opening 25, is secured to the lid panel 15 by means of bolts, or other suitable securing means 26, the opening 25 being of the same size and configuration as the opening 21 in the panel 15 and being disposed in alignment therewith.

Normally disposed within the aligned openings 21 and 25 is a tubular member 27 (as best shown in Figs. 3 and 4) comprising two oppositely disposed cylindrical metallic thimble members 28 and 29. The thimble member 28 is provided, at its inner end, with an integral radially inwardly extending flange 30, providing a centrally disposed aperture therein. The thimble member 29 is likewise provided with a radially inwardly extending flange 31, the central portion of which projects longitudinally through the aperture in the flange 30 and is bent radially outwardly at its ends overlying the flange 30 so as to lock the thimble members 28 and 29 into a unitary structure and providing an interconnecting passageway or aperture 39.

A ring member 32 and an attachment clip ring 33 are clamped between the flanges 30 and 31 of the portions 28 and 29 respectively. The ring member 32 has formed thereon an annular flange 34 provided with a plurality of circumferentially arranged resilient fingers 35 extending in the direction of the thimble portion 28. Each of these fingers preferably has an outwardly extending main body portion 36 and an inwardly extending tip or end portion 37. These portions are so constructed and arranged as to cause the portions 37 to yieldingly obstruct the insertion of the assembled thimble unit 28—29 into the aperture 26, and, upon the application of additional pressure thereto the portions 37 yield inwardly, permitting them to slide through the aperture 26 bringing the portions 36 thereof into engagement with the edges of the aperture 26, the flange 34 providing a stop for limiting the movement of the portion 28 through the aperture 26, and the inclination and resiliency of the fingers 36 holding the unitary thimble structure firmly, but removably, in position in the apertures 21 and 26. The attachment clip 33 is provided with an integral resilient extension finger 38 which extends parallel with the outer surface of the thimble portion 29.

An aperture 39, formed by the flange 31 of the portion 29, extends longitudinally between the thimble portions 28 and 29 to accommodate a suitable electrical conductor, such as a cable 40, which is electrically connected with the electric system of the motor vehicle in a manner well known to those familiar with the art. This cable 40 passes through an insulator 41 into engagement with an electric contact member 42 centrally mounted thereon, the insulator being housed within the thimble portion 28 and prevents withdrawal of the cable 40 through the outer end of thimble portion 29. The thimble portion 28 is adapted to receive an electric light globe 43 and has suitable means, such as bayonet type locking grooves 44, in the sides thereof for detachably holding the lamp 43 in engagement with the contact member 42. The electric current is supplied through the cable 40 to the contact member 42, causing the lamp 43 to illuminate, through the clear window, the license plate 17, and also to show through the red lens 23 as a tail light, the socket portion 28 being electrically grounded to the vehicle body.

If the vehicle operator desires to illuminate the trunk of the vehicle body, he raises the lid 12 to the position illustrated in Fig. 2 and pulls on the portion 29 to detach the flexible fingers 35 from within the aperture 26 so as to permit removal of the main body member 27 with the lamp 43. He then clips the finger 38 over the edge of one of the openings in the panel 16 which electrically grounds the socket portion 28 and the lamp 43 is lighted to illuminate the vehicle trunk. The finger 38 may, of course, be grounded on any other portion of the car and the cable 40 may be of any desired length so that it may be used in changing of tires, making minor repairs, and the like.

When it is again desired to use the light 10 as a tail light, the finger 38 is withdrawn from engagement with the edge of the inner panel 16 and the thimble assembly 27 is again inserted into the aperture 26 of the plate 24, the portions 36 of the resilient fingers 35 yieldingly engaging the plate to hold the thimble assembly 27 firmly in position.

In Fig. 5 is illustrated a slight modification of the invention in which the ring member 32 and the attachment clip 33 of the foregoing embodiment have been replaced by a single annular member 50 having a plurality of circumferentially arranged resilient fingers 51 extending in the direction of a lamp receiving portion 52. One of the fingers 51 has a resilient extension 53 which extends towards and close to the outer surface of an electric conductor member receiving portion 54. Each of the resilient fingers 51 preferably has a detent portion 55 and an inwardly extending end portion 56. These portions 55 and 56 are so constructed and arranged as to cause the portions 56 to yieldingly resist the insertion of the lamp receiving portion 52 into the aperture 26, and, upon the application of additional inserting pressure, the grooved portions 55 are snapped into the aperture 26 in engagement with the trunk lid plate 24 to hold the tubular member against movement relative to the plate 24.

Referring now to Figs. 6 to 8, wherein is illustrated another slight modification of the invention, the ring member 32 and the attachment clip 38 of the Fig. 4 embodiment have been replaced by a single annular member 60 having a single resilient extension finger 61 extending toward and close to the outer surface of an electric conductor member receiving portion 62 and that the aperture 26 in the plate 24 has two diametrically disposed notches 63 therein. The outer end of a lamp receiving portion 64 has two diametrically disposed outwardly extending ears 65 which are adapted to register with the notches 63 of the plate 24 and, upon rotation, to lockingly engage the plate 24. A ring 67 is slidably mounted on the lamp receiving portion 64 between the annular member 60 and the ears 65, a spring 68 being interposed between the member 60 and the ring 67 to yieldingly urge the ring toward the ears 65 to assist in holding the lamp receiving portion 64 in its secured position.

The improved light is inexpensive, simple and rugged and is especially adapted to serve as a trunk light, and as a tail light and rear license plate light for motor vehicle trunk bodies. The improved light is also readily adaptable for use in business coupe bodies having a deck lid which opens into a luggage compartment.

Various modifications and changes may be effected in the application without departing from the scope of the invention or from the scope of the appended claim.

What we claim is:

In combination with an automotive body including a deck lid closure member having an opening therein, a lens supporting body at the exterior of said member extending over said opening, a light fixture assembly including a pair of socket-forming members having adjacently disposed end wall-forming portions, one of said socket-forming members having a conductor receiving opening at one end thereof and the other of said socket members having a light bulb receiving opening at one end thereof, and means clamped between said end wall-forming portions for supporting said light fixture assembly, said supporting means including a plurality of resilient fingers extending toward said light bulb receiving opening for snap fastener engagement with the edges of the closure member surrounding the opening therein for supporting said assembly in operative position with respect to said housing, said securing means further including a resilient finger extending toward said conductor receiving opening and engageable with a support for said assembly when the latter is in non-operative position with respect to said housing.

NEWTON F. HADLEY.
GEORGE J. HUEBNER, Jr.